3,509,085
COPOLYMERS OF ETHYLENICALLY UNSATURATED HYDROXY FUNCTIONAL CYCLIC AMINE ETHERS
Kazys Sekmakas, Chicago, Ill., assignor to De Soto, Inc., Chicago, Ill., a corporation of Delaware
No Drawing. Filed Nov. 2, 1967, Ser. No. 679,998
The portion of the term of the patent subsequent to Dec. 5, 1984, has been disclaimed
Int. Cl. C08f 45/22; C09d 5/02
U.S. Cl. 260—29.6    9 Claims

ABSTRACT OF THE DISCLOSURE

Ethylenically unsaturated hydroxy-functional amines are produced by reacting ethylenically unsaturated monoepoxide such as glycidyl allyl ether or glycidyl acrylate or methacrylate with hydroxy derivatives of cyclic amines such as hydroxyethyl ethylene urea. The monoethylenic unsaturation of the epoxide is retained to produce an hydroxy amine which can be polymerized to form copolymers with other vinyl monomers. Emulsion copolymerization is particularly contemplated for the production of aqueous emulsion paints.

---

The present invention is related to the invention described in my prior copending application Ser. No. 572,180, filed Aug. 15, 1966, now U.S. Patent No. 3,356,655.

This invention relates to new ethylenically unsaturated hydroxy-functional amines and the production thereof as well as copolymers containing the same. The invention especially contemplates film forming aqueous emulsions of copolymerized ethylenically unsaturated materials, which emulsions deposit films which exhibit good adhesion to glossy or chalky surfaces and improved adhesion to surfaces previously coated with oil based paints, as well as improved water resistance. Adhesion to glossy alkyd surfaces is especially contemplated. More particularly, the present invention contemplates copolymer emulsions of fine particle size in which the dispersed particles of the emulsion are constituted by particles of emulsion copolymers of monoethylenically unsaturated materials including a proportion of the new unsaturated hydroxy-functional amines noted hereinbefore. If desired, a proportion of monoethylenically unsaturated materials providing oxirane or hydroxy functionality can be included in the emulsion copolymer.

Aqueous emulsions or latex paints are presently in wide use since they are inexpensive, apply easily with water clean-up after application, and the coatings dry rapidly with minimum odor. Unfortunately, and as is known, latex paints are subject to important disadvantages which have limited their utility and detracted from their potential value. Thus, available latex paints do not adequately adhere to previously painted surfaces which are glossy or chalky. Also, the deposited films lack desirable water resistant properties and the films do not adequately adhere to surfaces previously painted with oil based paints. When alkyd resins are used in combination to improve adhesion, especially to zinc oxide-containing oil paint films, water resistance is further impaired.

In accordance with the present invention, these disadvantages are overcome by employing aqueous emulsion copolymers or interpolymers of polymerizable monoethylenically unsaturated materials which include a small proportion of certain ethylenically unsaturated hydroxy-functional amines. The presence of these hydroxy derivatives especially in combination with the presence of the oxirane group or additional hydroxy groups which may also be present in the interpolymer markedly alters the character of the aqueous emulsion copolymer to provide emulsion coating systems which exhibit good adhesion to glossy or chalky surfaces and improved adhesion to surfaces painted with either zinc oxide-containing oil based paints or glossy alkyd paints. Also, and despite water application, the deposited films resist water well even when alkyd resins are used to upgrade adhesion to chalked surfaces.

The term aqueous emulsion copolymer is used to denote copolymers or interpolymers produced by copolymerizing a liquid mixture of polymerizable monomers dispersed in aqueous medium in the form of finely divided particles of sufficient fineness (up to about 3 microns) to be stably dispersed in water. As is known, aqueous emulsion copolymers are of very high molecular weight and the emulsion copolymer feature of the invention is in no way related to copolymers of far lower molecular weight which may be produced by other polymerization technique, such as suspension polymerization with produces polymer particles which are not stably suspended, solution polymerization or polymerization in bulk. Indeed, such copolymers are useless in the emulsions contemplated by the invention, though solution copolymers provide another and different feature of the invention.

In accordance with the present invention, ethylenically unsaturated monoepoxides such as glycidyl allyl ether or glycidyl acrylate or methacrylate are reacted with hydroxy derivatives of cyclic amines such as hydroxyethyl ethylene urea in an etherification reaction to form an ethylenically unsaturated hydroxy ether of the cyclic amine. It has been found that the etherification reaction takes place without addition polymerization and without consuming the amino functionality of the cyclic amine, e.g., the ethylene urea. In this way, there is produced new hydroxy-functional ethylenically unsaturated amines and there is no need to employ any saturated dicarboxylic acid as in my prior application Ser. No. 572,180, now U.S. Patent No. 3,356,655.

The monoethylenic unsaturation of the epoxide is retained and is capable of participating in addition polymerization. On this basis, the hydroxy amines which are produced can be incorporated into copolymers or interpolymers by known methods of polymerization, the preferred products being made by emulsion copolymerization. It should be specially noted that, like the products described in my said prior application, the present development forms a product in which the ethylenically unsaturated site is in a terminal position, e.g., a vinyl unsaturation, and this eases the burden of copolymerization with other vinyl monomers.

Also, and as noted in another of my copending applications, namely Ser. No. 528,359, filed Feb. 18, 1966, now U.S. Patent No. 3,356,654, the amino functional hydroxy amine or its ethylene urea progenitor can be partially reacted with aromatic mono-oxides which preferentially reacts with the amino group. In this way, the amine functionality can be replaced with hydroxy functionality to the extent desired.

From the broad standpoint, the unsaturated monoepoxide used in the invention is reacted with an hydroxy amine having the formula:

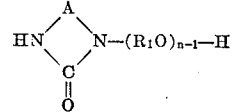

where:
$R_1$ is a $(C_2-C_3)$ alkylene group;
A is a $(C_2-C_3)$ alkylene group; and
$n$ is an integer having a value of 1 to 10;
To illustrate the preferred compounds in accordance with the invention, the cyclic amine is ethylene urea, and the hydroxy ethyl derivative is used; providing hydroxyethyl ethylene urea having the formula:

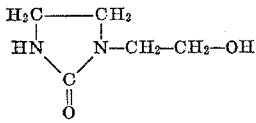

Any monoethylenically unsaturated organic monoepoxide may be used for reaction with hydroxy amines noted hereinbefore, the aliphatic compounds being preferred since these are strongly selectively reactive with the hydroxy group in preference to the amine group carried by the cyclic ethylene urea structure. As indicated hereinbefore, this preferential reaction is important in enabling the hydroxy group to be consumed by etherification while the desired amino group is retained together with the production of an essentially monomeric reaction product.

The preferred unsaturated monoepoxides are glycidyl esters and ethers such as glycidyl allyl ether and glycidyl acrylate or methacrylate and halogen, e.g., chlorine, substitution products thereof.

Other useful unsaturated aliphatic monoepoxides are illustrated by vinylcyclohexene monoxide.

Using glycidyl allyl ether to illustrate the development, the preferred products have the following formula:

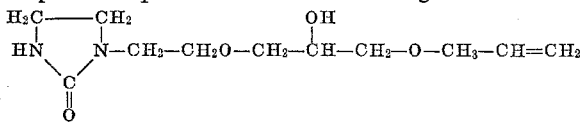

As will be understood from the foregoing, when the unsaturated monoepoxide is reacted with the hydroxy amine as previously described, there is produced compound having the formula:

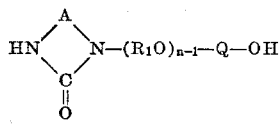

where $R_1$, A, and $n$ have been previously defined and Q is the monoethylenically unsaturated residue of unsaturated monoepoxide which carries the hydroxy group generated by reaction with the hydroxy group of the hydroxy amine.

The unsaturated monoepoxide reacts with the hydroxy group and not with the amino group of the ethylene urea derivative, in the presence or absence of an acidic catalyst, such as p-toluene sulfonic acid, so that the amine functionality is retained and the product is essentially monomeric. While acid catalysis of the reaction is not essential, the reaction is made more rapid by the presence of acids. The catalysis of the etherification reaction is well known and any catalyst known to favor etherification can be used.

The reaction is essentially stoichiometric, it being convenient to employ a small molar excess of unsaturated monoepoxide, e.g., a 10% excess. The amine functionality is not significantly disturbed.

Aromatic mono-oxide can be used if desired to increase the ratio of hydroxy functionality to amine functionality and, in this connection, it is desirable to employ styrene oxide or vinyl toluene oxide to react with a small proportion of the amino hydrogen groups which are available in order to increase the hydroxy functionality of the product while retaining the desired amine functionality. Desirably, from 2% up to about 20% of the available amino hydrogen atoms are reacted with aromatic monoxide, through this is not essential.

While the present invention includes the new hydroxy amine derivatives which have been produced and the production thereof as well as polymers and copolymers of from 0.1–20% by weight of this polyfunctional product with the balance of the addition polymer being other ethylenically unsaturated material copolymerizable therewith, especially monomers containing the $CH_2=C<$ group such as methyl methacrylate, ethyl acrylate, butyl acrylate, styrene, vinyl toluene, acrylonitrile and the like, an important feature of the invention is certain emulsion copolymers or interpolymers in which the hydroxy and amine functionality is supplemented by the use of oxirane-containing monomers or hydroxy-containing monomers in order to emphasize the desired wet adhesion properties.

Referring first to the broad area of copolymers which may be produced in accordance with the present invention, the unsaturatetd hydroxy amines which are produced in accordance with the invention are copolymerized with numerous other ethylenically unsaturated materials to form copolymers in which both the amine and the hydroxy functionality of the unsaturated hydroxy amine derivatives of the invention can be relied upon to provide thermosetting properties. This is especially true when the copolymer is a solution copolymer and includes other copolymerized materials providing reactive groups as are provided by hydroxy-containing ethylenic monomers or oxirane-containing ethylenic monomers. In these copolymers the unsaturated hydroxy-amine derivatives of the invention are desirably present in an amount of from 0.5% to 20% by weight, more preferably from 2–15% by weight. The hydroxy functional monomers are desirably present in an amount of from 2–30% by weight, preferably from 4–15% by weight. The oxirane-functional monomers are desirably present in an amount of from 0.5–20% by weight, preferably from 2–15% by weight.

The preferred hydroxy-functional monomers are illustrated by 2-hydroxy ethyl and 2-hydroxy propyl acrylate and methacrylate, though these are merely illustrative of the class which also includes other hydroxy alkyl methacrylates and acrylates such as 3-hydroxy propyl methacrylate, 4-hydroxy butyl methacrylate and the corresponding acrylates. Still further hydroxy-containing monomers which may be used are ethylene glycol allyl ether, propylene glycol allyl ether, butylene glycol allyl ether, diethylene glycol allyl ether, trimethylol propane allyl ether and 2-hydroxy-methyl-5-norbornene (either the endo isomer or the exo isomer or mixtures thereof). Still further, allyl alcohol, methallyl alcohol, crotyl alcohol and unsaturated fatty alcohols corresponding to drying oil fatty acids may be used.

The oxirane-containing monomers which may be used to provide thermosetting properties to the solution copolymers which are contemplated are the same as those which have been noted hereinbefore for reaction with the cyclic hydroxy amine, e.g., glycidyl acrylate, allyl glycidyl ether, glycidyl vinyl ether, dipentene monoxide, etc.

With respect to the aqueous emulsion interpolymers, these are formulated to include from 0.1–5% by weight, based on the total weight of copolymerizable material, of the unsaturated hydroxy amine product referred to. While 5% is a preferred maximum, up to 15% of the hydroxy amine product may be tolerated, though this is wasteful.

The aqueous emulsion interpolymers may be formulated to further include either or both of the oxirane-containing monomers and the hydroxy-containing monomers which have been described. However, these are used in small amounts and preferably in proportions of about 0.2–5% by weight, though as little as 0.1% has some effect and about 15% may be tolerated. These materials function to provide, in combination with the amino alcohol, superior water resistance, wet adherence and adherence to glossy and oil painted surfaces which are the objectives of the invention. It is particularly preferred that the oxirane material, if used, be ammoniated or aminated. More preferably, the oxirane-containing or hydroxy-containing materials are used in proportions of from 0.2–3% by weight.

The oxirane groups of the copolymer (when these are included) are preferably reacted with aminating and/or ammoniating agents to form the emulsion copolymers of the present invention. Apparently, the aminating and/or ammoniating agents react with the oxirane ring to cause the same to open, a hydrogen atom from the aminating or ammoniating agent combining with the oxygen atom to form an hydroxyl group, and the residue of the agent is directly attached to the remaining carbon atom of the oxirane ring.

The remainder of the emulsion copolymer consists essentially of at least one other monoethylenically unsaturated monomer, preferably one having no functional group other than the $CH_2=C<$ group. The numerous materials which may be used either alone or in mixtures are illustrated by methyl acrylate, ethyl acrylate, methyl methacrylate, butyl acrylate, styrene, 2-ethylhexyl acrylate, vinyl toluene, vinyl acetate, acrylonitrile, vinylidene chloride, etc. Small proportions, up to 5% by weight, of materials having a functional group other than the ethylenic group such as acrylic acid, acrylamide, methylol acrylamide, or aminoacrylates may also be present but, and with the exception of up to about 5% of unsaturated acid, monomers supplying other functional groups should be limited to amounts less than 3% by weight.

It is preferred that the monomers be selected to provide a copolymer having a glass transition temperature below room temperature so that the copolymer particles will coalesce by themselves without the necessity of applying external heat. However, the monomers can be selected to provide a copolymer having a higher glass transition temperature and higher boiling water miscible solvents may be used as taught in U.S. Patent 3,032,521. Water immiscible solvents, such as butyl Cellosolve acetate, can also be used.

While the present invention primarily contemplates aqueous emulsions which will provide flat-appearing coatings, a degree of surface gloss may be provided as taught in my copending application Ser. No. 440,628, filed Mar. 17, 1965, now U.S. Patent No. 3,470,126.

The details of the amination or ammoniation reaction are discussed in my said copending application and the details of the preferred emulsion copolymerization are set forth in my copending applications Ser. Nos. 506,273, filed Nov. 3, 1965, now U.S. Patent No. 3,356,653, and 528,359, filed Feb. 18, 1966, now U.S. Patent No. 3,356,654.

The invention is illustrated in the Examples which follow in which all parts are by weight.

EXAMPLE 1.—PREPARATION OF UNSATURATED HYDROXY ETHER

| Grams | | |
|---|---|---|
| 390 | Hydroxy ethyl ethylene urea. | Charge into a reactor equipped with an agitator, thermometer and a nitrogen inlet tube. Heat to 200° C. in 60–70 minutes. Hold for 3 hours at 200–205° C. Nonvolatile matter: 98.6% after 3 hours at 200° C. |
| 372 | Allyl glycidyl ether | |
| 0.76 | p-Toluene sulfonic acid | |

EXAMPLE 2.—PREPARATION OF EMULSION POLYMER

| Grams | | | |
|---|---|---|---|
| 920 | Water | "A" | Charge into reactor equipped with agitator, reflux condenser, thermometer and nitrogen inlet tube. Heat to 77–80° C. |
| 1.7 | Sodium bicarbonate | | |
| 5.0 | Potassium persulfate | | |
| 920 | Water | "B" | In a separate vessel dissolve surfactants in 120 grams of water using vigorous agitation and add thereto the product of Example 1 and the remaining water. |
| 13.6 | Sodium lauryl sulfate | | |
| 40.8 | Nonylphenoxy polyethyleneethanol | | |
| 54.0 | Product of Example 1 | | |
| 1,105 | Ethyl acrylate | "C" | Premix monomers and add to "B" using vigorous agitation. Add mixture of "B" and "C" to reactor containing "A" over 2½–3 hours at 77–80° C. Hold for one hour and then cool to 30° C. |
| 527 | Methyl methacrylate | | |
| 17 | Glacial methacrylic acid | | |
| 21.5 | Ammonium hydroxide | "D" | Add "D" to adjust pH to 9.0–10.0. Strain through cheesecloth. |
| 21.5 | Water | | |

Final characteristics

Solids—47.7%
Viscosity—28 centipoises
pH—9.8
Grain in the film—None

EXAMPLE 3

Example 2 was repeated, with the exception that 0.5% of glycidyl methacrylate (based on the total weight of monomers) was included in the monomer charge. Excellent wet adhesion results were obtained with this polymer.

EXAMPLE 4

Example 2 was repeated, with the exception that 0.5% of hydroxyethyl methacrylate (based on the total weight of monomers) was included in the monomer charge. Excellent wet adhesion results also were obtained.

EXAMPLE 5.—PREPARATION OF SOLUTION POLYMER

| Grams | | |
|---|---|---|
| 500 | 2-ethoxy ethanol | Heat to 240° F. |
| | Monomer Premix | |
| 400 | Isobutyl acrylate | Premix monomers and catalyst and add over 2 hour period at 240–250° F. and hold for 1 hour. |
| 100 | Product of Example 2 | |
| 250 | Ethyl acrylate | |
| 50 | Styrene | |
| 200 | 2-hydroxy ethyl acrylate | |
| 50 | Acrylic acid | |
| 35 | Benzoyl peroxide | |
| 4 | Benzoyl peroxide | Add and hold for 2 hours. |
| 4 | ___do___ | Do. |
| 72 | Triethyl amine | Cool to 140° F. and add to dissolve resin. |
| 570 | Water | |

The final characteristics of the product are:

Solids—45%
Viscosity (Gardner-Holdt)—U–V
Color (Gardner)—5–6

This water solution forms a thermosetting coating when applied on a metal substrate and baked 20 minutes at 350° F.

There is submitted in Table I hereinafter an indication of the properties of house paints formulated from the emulsion interpolymers produced in accordance with the invention in comparison with other similar emulsion. The house paint is made by pigmenting the emulsion to a pigment to binder ratio of 1.4:1 using a pigment mixture of 26% zinc oxide, 26% titanium dioxide and 48% calcium carbonate.

In the tests, wooden trim panels are painted with a standard zinc oxide pigmented linseed oil exterior house paint, and the painted panels are exposed to the weather for nine months, rendering them chalky and difficult to overcoat with emulsion paints. The panels are then wiped with a dry rag to remove surface dirt and the like and are then repainted with the emulsions under test. Other panels painted with a glossy alkyd resin are similarly prepared and repainted with the emulsion under test.

The repainted panels are then submerged in water for 18 hours, and the wet panels are frozen in a freezer to below the freezing point of water and then thawed to room temperature to provide a single test cycle. This test cycle is then repeated several times and adhesion is measured after each cycle by rubbing the coating vigorously with the finger to determine whether the paint comes off the panels.

The overall rating of the coatings are numerically evaluated as follows:

Rubs to remove wet film from chalky surface

1 _____ Poor (coating completely removed).
2–4 _____ Fair.
5–6 _____ Good.
9–10 _____ Very good.
10 _____ Excellent (wet rubbing does not affect the paint film).

Additionally, it is common to modify an acrylic latex paint by blending 75 parts by weight of the acrylic emulsion with 25 parts of an emulsion of an oil polyester. Example 6 which follow shows the production of a typical oily polyester emulsion useful as indicated and a 75/25 blend with the polyester of Example 6 is denoted hereinafter by the language "Modified with Polyester Emulsion."

EXAMPLE 6

Preparation of polyester emulsion for improved wetting of chalky substrate

An oily polyester which is used for improved adhesion to chalky surfaces is produced by charging to a kettle 8,800 pounds of linseed fatty acids, 7200 pounds of a styrene-allyl alcohol resinous polyol (see note 1) and 30 gallons of xylol.

The mixture is heated slowly with agitation using a nitrogen sparge until the resinous polyol has melted, whereupon the rate of agitation and heating are increased to raise the temperature to 480° F. 120 pounds of pentaerythritol are added when the mixture is at 300° F. and while the mixture is being rapidly heated with vigorous agitation. The mixture is held at 480° F. for an acid value of 20, whereupon the xylol is stripped away with continued cooking. When the acid value reaches 16, the product is rapidly cooled with water to 350° F. and filtered to provide a product having the following characteristics:

Soilds—98%
Viscosity (Gardner-Holdt)—$Z_5$-$Z_7$
Acid value—14–16
Color (Gardner)—6

*Note 11.*—The resinous polyol is a copolymer of styrene and allyl alcohol having an average molecular weight of 1600, a softening temperature (ASTM E28-517) of 95–105° C. and an available hydroxy content of from 5.4 to 6.0% measured by a modified acetic anhydride test (see Ind. Eng. Chem. Anal. Edition, 17, 394–7 (1945).

45 gallons of the oil polyester of the present example are mixed with 1.25 gallons of a 28% aqueous solution of ammonium hydroxide and the mixture has added to it slowly over a 1½ hour period, 38 gallons of water. Stirring is continued for an additional ½ hour after which 14 additional gallons of water are added slowly over a 1 hours period with continued agitation. At this point, 1 gallon of ethylene glycol is added together with a gallon of a foam control agent, the latter being optional. The final emulsion has a solids content of 44.1%, a pH of 9.7, a #4 Ford Cup viscosity of 13–15 seconds and the emulsion has an average particle size range of from 0.5–3.0 microns.

TABLE I.—WET ADHESION PROPERTIES

| | Substrate | | | | | |
|---|---|---|---|---|---|---|
| | Zinc oxide-pigmented linseed oil exterior house paint | | | Glossy alkyd resin house paint | | |
| Freeze-Thaw Cycles | 0 | 1 | 5 | 0 | 1 | 5 |
| Standard Commercial Product X | 10+ | 1 | 1 | 10+ | 10+ | 1 |
| Example 2 | 3 | 1 | 1 | 10+ | 10+ | 10+ |
| Example 4 | 10+ | 1 | 1 | 10+ | 10+ | 1 |
| Commercial Product X Modified with Polyester Emulsion | 1 | 1 | 1 | 10+ | 10+ | 3 |
| Example 2 Modified with Polyester Emulsion | 10+ | 10+ | 2 | 10+ | 10+ | 1 |
| Example 4 Modified with Polyester Emulsion | 10+ | 10+ | 1 | 10+ | 10+ | 1 |

In connection with the above evaluation of the present invention, comparison has been made with the best available competitive emulsion material known to me, and which is identified by the letter X. The chemical constitution of this competitive material is not specifically known to me.

As can be seen, the products of Examples 2 and 4 are fully comparable to this outstanding commercial standard on glossy alkyd surfaces and, when modified with polyester emulsion, are significantly superior over zinc oxide-pigmented linseed oil exterior house paint. The capacity to maintain god wet adhesion over either surface has obvious value.

The invention is not to be construed by any abstract of the disclosure, but is instead defined in the claims which follow.

I claim:

1. A solution copolymer containng from 0.5 to 20% by weight of the copolymer of compound having the formula:

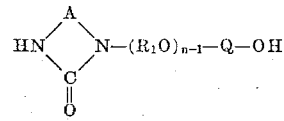

where:

$R_1$ is a $(C_{2-3})$ alkylene group
A is a $(C_2$–$C_3)$ alkylene group;
n is an integer having a value of 1 to 10; and
Q is the monoethylenically unsaturated residue of unsaturated monoepoxide, at least one copolymerizable monomer containing a single $CH_2$=$C<$ group and carrying a functional group selected from the group consisting of hydroxy functionality and oxirane functionality, and at least one further copolymerizable monomer containing a single $CH_2$=$C<$ group 2. An aqueous emulsion copolymer consisting essentially of from 0.1 to 15% by weight of the copolymer of compound having the formula:

$$HN\diagup^{A}_{\diagdown C\diagup}N-(R_1O)_{n-1}-Q-OH$$
$$\parallel$$
$$O$$

where:

$R_1$ is a $(C_2$—$C_3)$ alkylene group
A is a $(C_2$–$C_3)$ alkylene group;
n is an integer having a value of 1 to 10; and
Q is the monoethylenically unsaturated residue of unsaturated monoepoxide, and at least one copolymerizable monomer containing a single $CH_2$=$C<$ group and copolymerizable with said compound in aqueous emulsion.

3. An aqueous emulsion copolymer consisting essentially of from 0.1 to 5% by weight of the copolymer of compound having the formula:

$$HN\diagup^{A}_{\diagdown C\diagup}N-(R_1O)_{n-1}-Q-OH$$
$$\parallel$$
$$O$$

where:

$R_1$ is a $(C_2$–$C_3)$ alkylene group;
A is a $(C_2$–$C_3)$ alkylene group;
n is an integer having a value of 1 to 10; and
Q is the monoethylenically unsaturated residue of unsaturated monoepoxide, from 0.2–5% by weight of the copolymer of at least one copolymerizable monomer containing a single $CH_2$=$C<$ group and carrying a functional group selected from the group consisting of hydroxy functionality and oxirane functionality, and at least one further copolymerizable monomer containing a single $CH_2$=$C<$ group and copolymerizable with said compound in aqueous emulsion.

4. The copolymer of claim 3 in which said compound has the formula:

$$H_2C\text{---}CH_2$$
$$HN\diagup\quad\diagdown N-CH_2-CH_2O-Q-OH$$
$$\diagdown C\diagup$$
$$\parallel$$
$$O$$

5. The copolymer of claim 3 in which said copolymer is reacted with ammonia or a volatile amine.

6. The copolymer of claim 2 in which said monoethylenically unsaturated monoepoxide is selected from the group consisting of glycidyl ethers and glycidyl esters of a monomer containing a single $CH_2=C<$ group.

7. The copolymer of claim 2 in which said compound is the etherification reaction product of hydroxyethyl ethylene urea with glycidyl allyl ether.

8. The copolymer of claim 2 in which a portion of the amino hydrogen atoms in said compound is reacted with an aromatic mono-oxide.

9. The copolymer of claim 3 in which from 2-20% of the amino hydrogen atoms in said compound are reacted with an aromatic mono-oxide selected from the group consisting of styrene oxide and vinyl toluene oxide.

References Cited

UNITED STATES PATENTS

| | | | |
|---|---|---|---|
| 3,194,792 | 7/1965 | Emmons et al. | 260—78.5 XR |
| 3,356,653 | 12/1967 | Sekmakas | 260—78.5 |
| 3,356,654 | 12/1967 | Sekmakas | 260—78.5 |
| 3,356,655 | 12/1967 | Sekmakas | 260—78.5 |
| 3,470,126 | 9/1969 | Sekmakas et al. | 260—78.5 XR |

JULIUS FROME, Primary Examiner

J. B. EVANS, Assistant Examiner

U.S. Cl. X.R.

260—80.3, 250, 309.7, 837